United States Patent
Hawkins

(10) Patent No.: US 8,667,720 B2
(45) Date of Patent: Mar. 11, 2014

(54) PRODUCT HIGHLIGHTER

(75) Inventor: Laura L. Hawkins, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 0 days.

(21) Appl. No.: 13/466,491

(22) Filed: May 8, 2012

(65) Prior Publication Data
US 2013/0298376 A1 Nov. 14, 2013

(51) Int. Cl.
*A47F 7/00* (2006.01)

(52) U.S. Cl.
USPC ........................................ 40/661.03; 211/59.4

(58) Field of Classification Search
USPC ........... 40/661.03, 782; 211/59.4; 248/225.21
See application file for complete search history.

(56) References Cited

U.S. PATENT DOCUMENTS

| | | | |
|---|---|---|---|
| 1,317,589 A | 9/1919 | Noziska | |
| 1,486,139 A | 3/1924 | Herring et al. | |
| 1,921,102 A | 8/1933 | Slattery | |
| 1,959,001 A | 5/1934 | Kasten | |
| 2,154,658 A | 4/1939 | Boston | |
| 3,034,612 A * | 5/1962 | Jourdan | 403/382 |
| 3,151,744 A * | 10/1964 | Patterson | 211/59.4 |
| 5,042,180 A | 8/1991 | Horiuchi | |
| 5,350,057 A | 9/1994 | Bemis et al. | |
| 5,860,537 A | 1/1999 | Loew | |
| 5,924,367 A | 7/1999 | Henke et al. | |
| 6,336,564 B1 | 1/2002 | Garnier | |
| 6,457,689 B1 | 10/2002 | Padiak et al. | |
| 7,293,381 B2 * | 11/2007 | Primiano et al. | 40/472 |
| 7,946,066 B2 * | 5/2011 | Wamsley | 40/657 |
| 2007/0236111 A1 | 10/2007 | Gray | |
| 2008/0172917 A1 | 7/2008 | Brandow et al. | |
| 2008/0235085 A1 | 9/2008 | Kovinsky et al. | |
| 2010/0044326 A1 | 2/2010 | Meyer-Hanover et al. | |
| 2010/0116760 A1 * | 5/2010 | Fazzone | 211/49.1 |
| 2011/0023345 A1 * | 2/2011 | Ellingson | 40/714 |
| 2011/0049065 A1 | 3/2011 | Katz | |

FOREIGN PATENT DOCUMENTS

FR 2563030 A1 10/1985
NL 1004388 C1 11/1996

OTHER PUBLICATIONS

TNS Global, "Mid-Caps: Break Out of the Pack," http://blogs.tnsglobal.com/retail_shopper/2009/05/midcaps-break-out-of-the-pack-.html, 2 pages, May 11, 2009.
Pending U.S. Appl. No. 29/420,359, filed May 8, 2012, entitled Display Structure, 12 pages.

(Continued)

*Primary Examiner* — Kristina Junge
(74) *Attorney, Agent, or Firm* — Griffiths & Seaton PLLC; JoAnn M. Seaton

(57) ABSTRACT

A product highlighter includes a frame configured to surround merchandise located on a first display shelf of a display shelving unit. The frame includes an upper frame member, a lower frame member spaced apart from the upper frame member, a first side frame member coupling the upper frame member to the lower frame member, and a second side frame member spaced apart from the first side frame member and coupling the upper frame member to the lower frame member. The lower frame member is attached to an underside of the first display shelf with at least one first bracket and the upper frame member is attached to an underside of a second display shelf located directly above the first display shelf with at least one second bracket.

20 Claims, 8 Drawing Sheets

(56) References Cited

OTHER PUBLICATIONS

Office Action from Canadian Patent No. 2,780,628, mailed Oct. 29, 2012 (2 pages).

Office Action from Canadian Patent Application No. 2,780,628, mailed Mar. 25, 2013 (3 pages).

Office Action from Canadian Patent Application No. 2,780,628, mailed Sep. 3, 2013 (3 pages).

* cited by examiner

PRODUCT HIGHLIGHTER

BACKGROUND

A retail store uses display shelves to organize and present products or merchandise to customers for purchase. A display shelving unit includes display shelves that both support the products for display while simultaneously indicating product price.

Often, retailers desire to highlight certain products that are being displayed for sale. For example, a retailer may want to bring certain products to the attention of the customer because they were advertised in a certain media format, such as a catalog, a mailer or a commercial. In another example, a retailer may want to highlight certain products that have certain characteristics not possessed by similarly displayed products, such as products that are on sale, new product offerings or products that have associated promotional incentives.

The discussion above is merely provided for general background information and is not intended to be used as an aid in determining the scope of the claimed subject matter.

SUMMARY

A product highlighter includes a frame configured to circumscribe merchandise located on a first display shelf of a display shelving unit. The frame includes an upper frame member, a lower frame member spaced apart from the upper frame member, a first side frame member coupling the upper frame member to the lower frame member, and a second side frame member spaced apart from the first side frame member and coupling the upper frame member to the lower frame member. The lower frame member is attached to an underside of the first display shelf with at least one first bracket and the upper frame member is attached to an underside of a second display shelf located directly above the first display shelf with at least one second bracket.

In a further embodiment, the upper frame member, the lower frame member, the first side frame member and the second side frame member all include the substantially same profile including a channel portion and a track portion. The channel portion and the track portion share a central wall.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein include a product highlighter that surrounds or circumscribes products or merchandise located on a first display shelf of a display shelving unit in a retail store to draw customer attention to the merchandise. The product highlighter includes a window defining an opening through which the products or merchandise resting on the first display shelf are viewable. A lower portion of the window is attached to an underside of the first display shelf so that the lower portion of the window is located below the first display shelf and an upper portion of the window is attached to an underside of a second display shelf located directly above the first display shelf so that the upper portion of the window is located above the product or merchandise, but below the display shelf located directly above the first display shelf.

Figure 1:
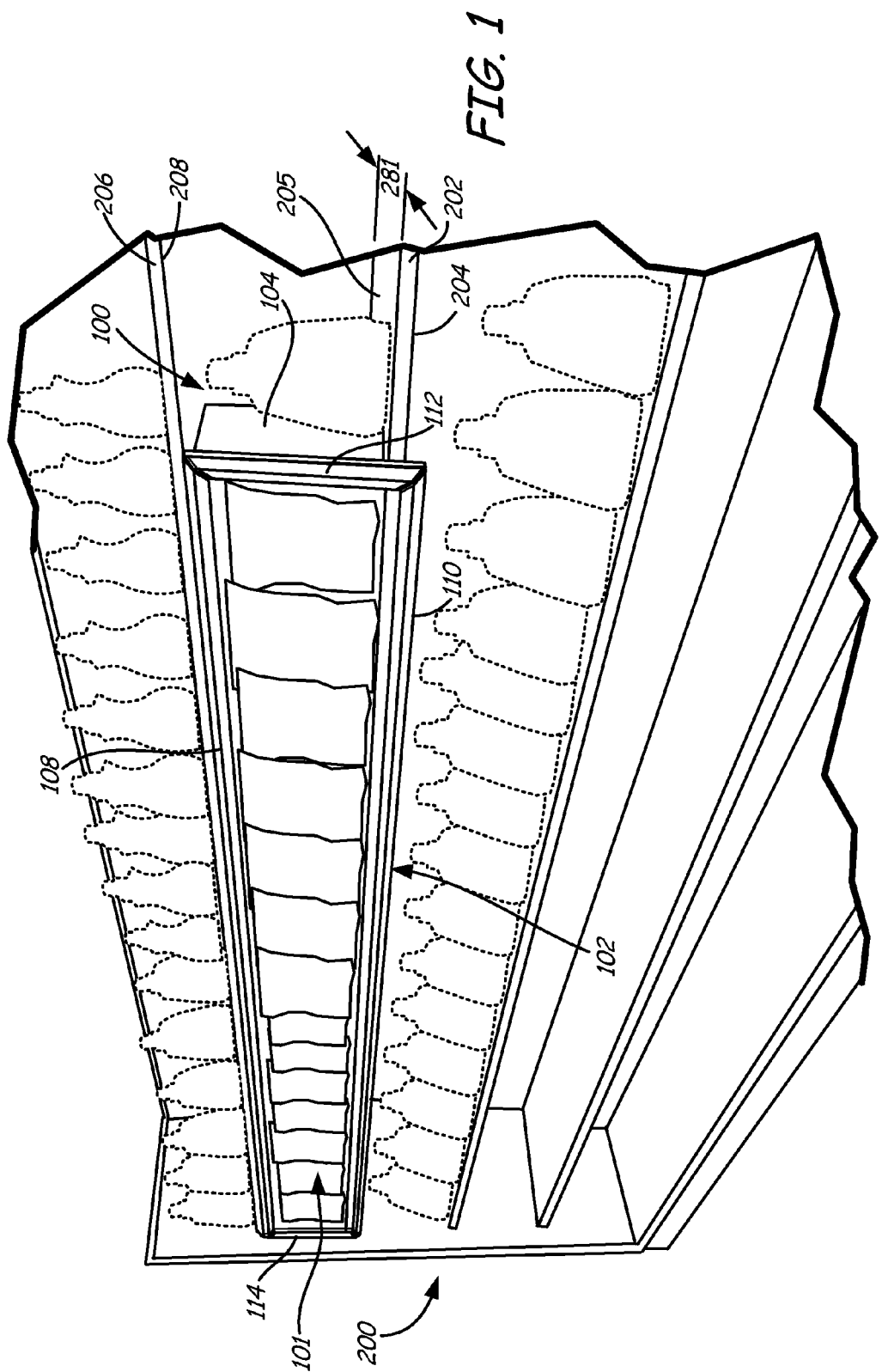
FIG. 1 is a perspective view of an exemplary product highlighter that highlights products on a display shelf of a display shelving unit.

FIG. 1 is a perspective view of an exemplary product highlighter 100 that highlights products on a first display shelf or first display shelf 202 of a display shelving unit 200. As illustrated, product highlighter 100 includes at least a window or frame 102 that surrounds or circumscribes product(s) or merchandise 101 and a pair of side panels or dividers (of which only the right side panel or divider 104 is illustrated in FIG. 1). Window or frame 102 includes an upper portion or first horizontal frame member 108, a lower portion or second horizontal frame member 110, a first side portion or vertical frame member 112 and a second side portion or vertical frame member 114. All of portions or frame members 108, 110, 112 and 114 of window 102 include the substantially same profile shape, but portions or frame members 108 and 110 include a first length that can be the substantially similar or different than a second length of portions or frame members 112 and 114.

As further illustrated in FIG. 1, product highlighter 100—including window or frame 102 and side panel 104—does not rest on first display shelf 202. Rather, lower portion or second horizontal frame member 110 is attached to an underside 204 of first display shelf 202 and upper portion or first horizontal frame member 108 is attached to an underside 208 of a second display shelf 206, which is located directly above first display shelf 202. In this fashion, lower horizontal frame member 110 is located below a top surface of first display shelf 202 and upper horizontal frame member 108 is located above product(s) or merchandise 101, but below a top surface 205 of display shelf 206. In this configuration, product highlighter 100 unobtrusively highlights product(s) or merchandise while still allowing price labels located on the front of the shelf to be visible. In addition, product can be easily removed from the first display shelf for purchase or easily restocked.

Figure 2:
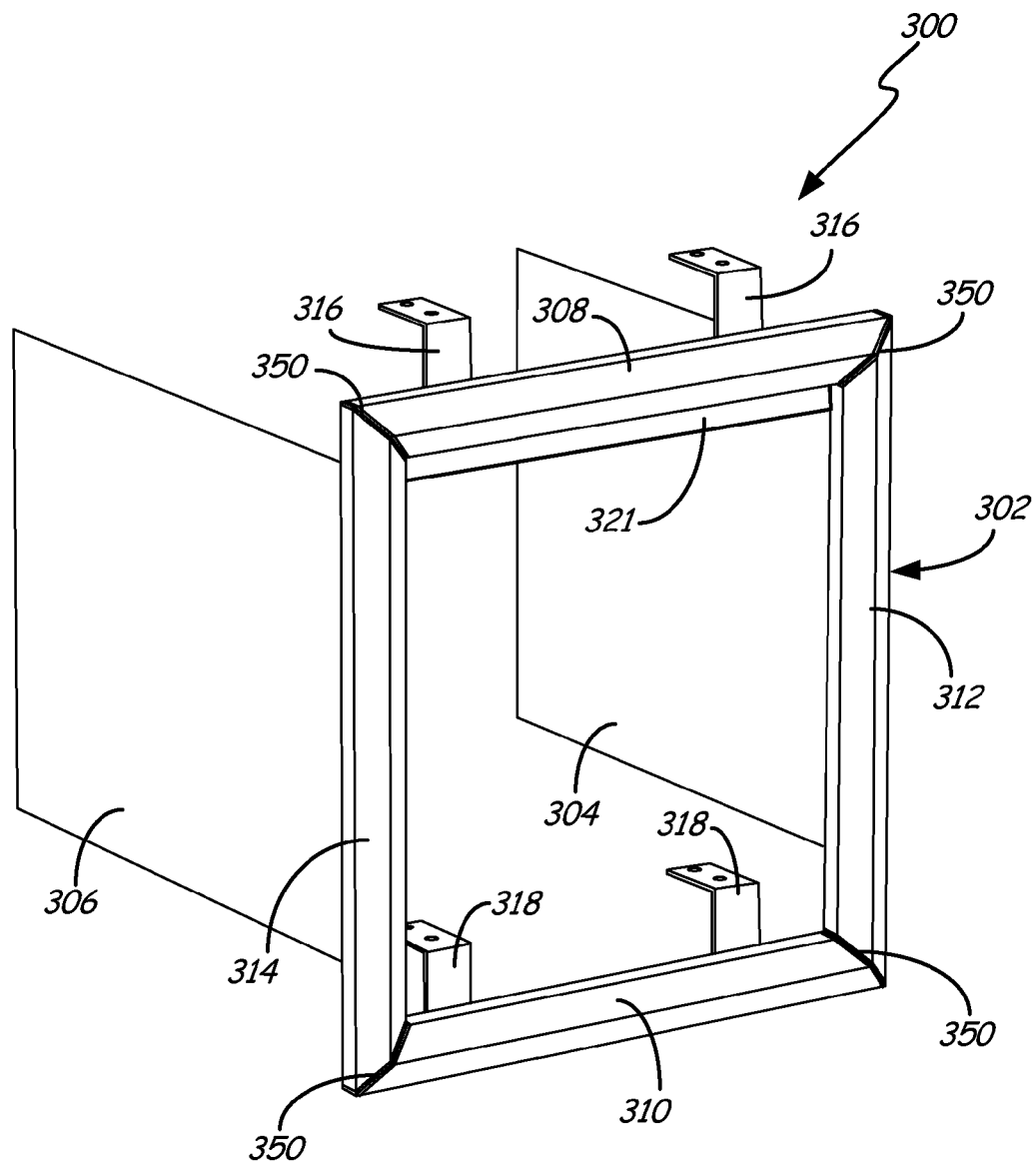
FIG. 2 is a front perspective view of another exemplary product highlighter that highlights products on a display shelf.
Figure 3:
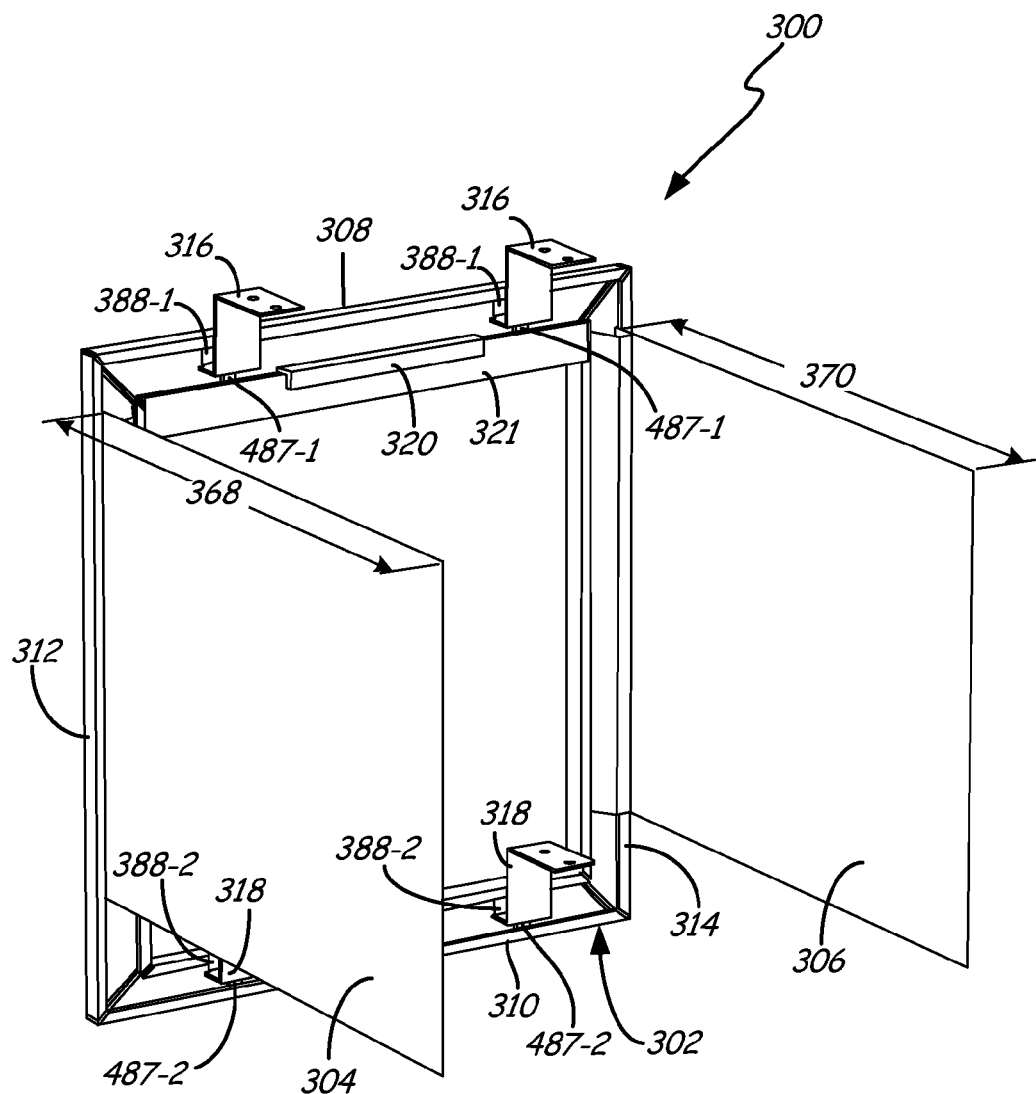
FIG. 3 is a rear perspective view of the product highlighter illustrated in FIG. 2.

FIG. 2 is a front perspective view of another exemplary product highlighter 300 that highlights products on a display shelf, such as display shelf 202 illustrated in FIG. 1. FIG. 3 is a back perspective view of product highlighter 300. As illustrated in FIGS. 2 and 3, product highlighter 300 includes a frame 302, a first side panel or divider 304 and a second side panel or divider 306. Product highlighter 300 also includes at least one first bracket 316, at least one second bracket 318 and a sign holder member 320 (FIG. 3).

As previously described in connection with exemplary frame 102 illustrated in FIG. 1, frame 302 includes an upper portion or first horizontal frame member 308, a lower portion or second horizontal frame member 310, a first side portion or first vertical frame member 312 and a second side portion or second vertical frame member 314. All of frame members 308, 310, 312 and 314 are straight frame members and include substantially the same profile shape. However, frame members 308, 310, 312 an 314 can include different lengths. For example and as illustrated, frame members 308 and 310 include a first length and frame members 312 and 314 include a second length, wherein the second length is less than the first length. Upper frame member 308 is spaced apart from and substantially parallel to lower frame member 310 and first side frame member 312 is spaced apart from and substantially parallel to second side frame member 314 such that both first side frame member 312 and second side frame member 314 couple upper frame member 308 to lower frame member 310.

Figure 4:
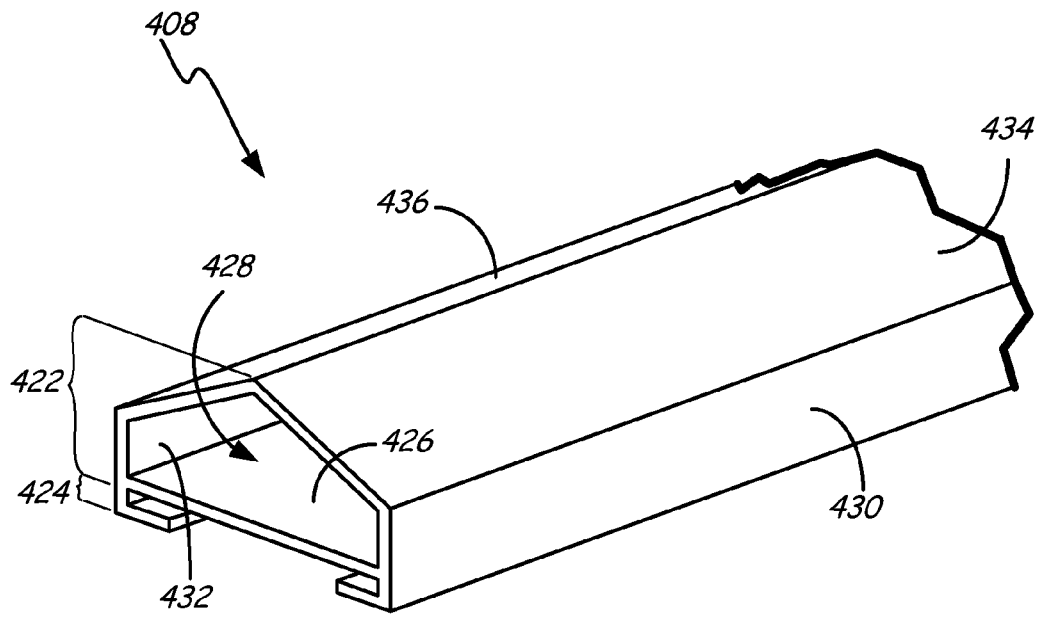
FIG. 4 is a perspective view of an exemplary portion of a straight frame member of a product highlighter.
Figure 5:
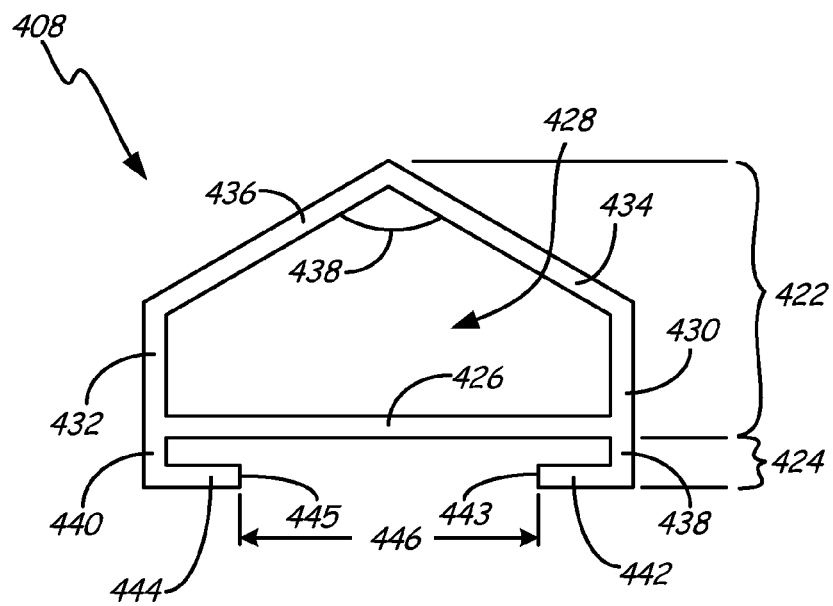
FIG. 5 is a profile view of the exemplary straight frame member of FIG. 4.

FIG. 4 is a perspective view of an exemplary straight frame member 408 and FIG. 5 is a profile view of exemplary straight frame member 408. Frame member 408 is made of a single, continuous material, such as styrene or other type of polymer or metal, and can be used for any of horizontal or vertical frame members 108, 110, 112, 114 in FIG. 1 and any of horizontal or vertical frame members 308, 310, 312 and 314 in FIGS. 2 and 3. Straight frame member 408 includes a channel or channel portion 422 and a track or track portion 424 that share a central wall 426.

In profile, channel portion 422 of frame member 408 forms a pentagonal shape and includes a passageway 428. Passageway 428 is defined by central wall 426, a first side wall 430, a second side wall 432, a first front wall 434, and a second front wall 436. Central wall 426 intersects with first side wall 430, first side wall 430 intersects with first front wall 434, first front wall 434 intersects with second front wall 436 and second front wall 436 intersects with second side wall 432 to form passageway 428. While central wall 426 is oriented substantially perpendicularly to first side wall 430 and substantially perpendicularly to second side wall 432, first front wall 434 and second front wall 436 are oriented from each other at an angle 438 that is greater than 90 degrees.

Track or track portion 424 of frame member 408 includes a c-shaped profile that is defined by central wall 426, a first side wall 438, a second side wall 440, a first leg 442 that extends from first side wall 438 and terminates at a free end 443 and a second leg 444 that extends from second side wall 440 and terminates at a free end 445. Central wall 426 intersects with first side wall 438, which is in alignment with first side wall 430 of channel portion 422, and central wall 426 intersects with second side wall 440, which is in alignment with second side wall 432 of channel portion 422. Free end 443 of first leg 442 and free end 445 of second leg 444 are located a first distance 446 from each other to form the c-shaped profile of track portion 424.

With reference back to FIGS. 2 and 3, frame 302 includes four corners or four corner frame members 350. In particular, upper portion or first horizontal frame member 308 is coupled to first side portion or first side frame member 312 by a first corner or first corner frame member 350, upper portion or first horizontal frame member 308 is also coupled to second side portion or second side frame member 314 by a second corner or second corner frame member 350, lower portion or second horizontal frame member 310 is coupled to first side portion or first side frame member 312 by a third corner or third corner frame member 350 and lower portion or second horizontal frame member 310 is also coupled to second portion or second side frame 314 by a fourth corner or fourth corner frame member 350.

Figure 6:
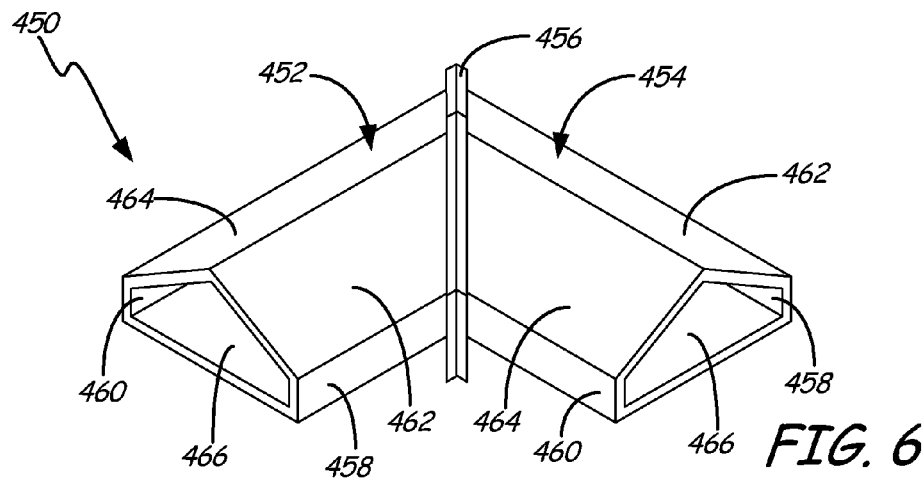
FIG. 6 is a perspective view of an exemplary corner frame member of a product highlighter.
Figure 7:
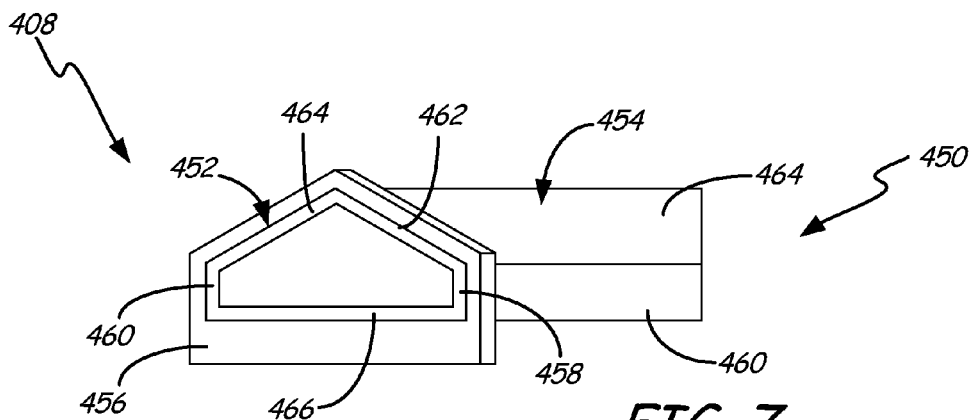
FIG. 7 is a profile view of the exemplary corner frame member of FIG. 5.

FIG. 6 is a perspective view of an exemplary corner or corner frame member 450 and FIG. 7 is a profile view of exemplary corner or corner frame member 450. Corner frame member 450 is made of a single, continuous material, such as styrene or other type of polymer or metal, and can be used for any of corner frame members 350 illustrated in FIG. 2. Corner frame member 450 includes a first body member 452 separated from a second body member 454 by an angled protrusion or protrusion piece 456. First body member 452 and second body member 454 are oriented substantially perpendicularly to each other. Angled protrusion 456 projects from the outer surfaces of first body member 452 and second body member 454 and extends from an inner corner of corner frame member 450 to an outer corner of corner frame member 450. Both first body member 452 and second body member 454 include pentagonal profiles that are substantially similar to the pentagonal profile of channel portion 422 of frame member 408, but having a cross-sectional dimension that is less than a cross-sectional dimension of the channel portion 422 of frame member 408. First body member 452 and second body member 454 include a first side wall 458, a second side wall 460, a first front wall 462, a second front wall 464, and a back wall 466.

Figure 8:
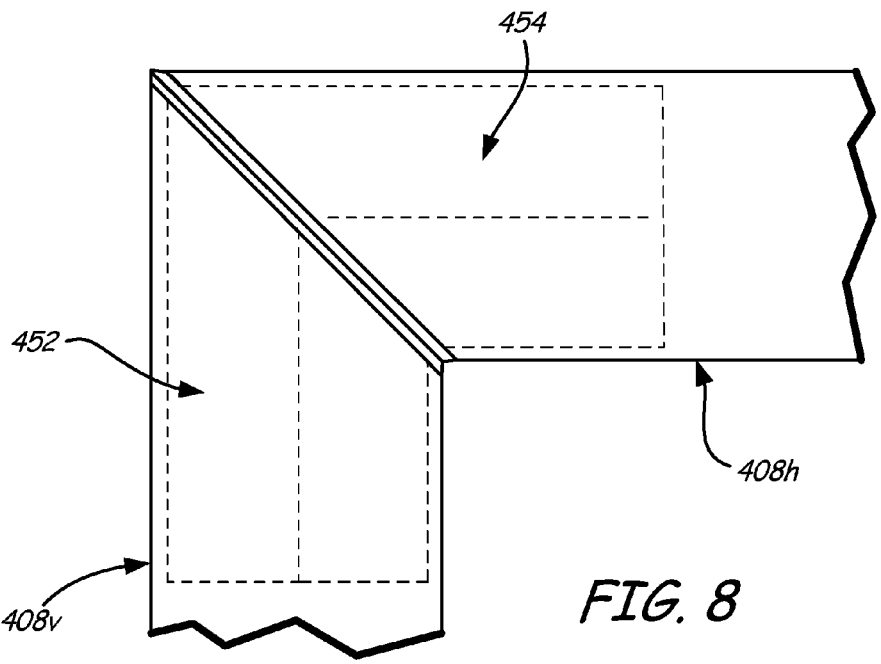
FIG. 8 is a top view illustrating the exemplary corner frame member of FIGS. 6 and 7 receiving an exemplary first straight frame member and an exemplary second straight frame member.

FIG. 8 is a top view illustrating second body member 454 of corner frame member 450 (FIGS. 6 and 7) receiving an end portion of an exemplary straight frame member 408h and first body member 452 of corner frame member 450 receiving an end portion of an exemplary frame member 408v. In this case, exemplary straight frame member 408h is acting as a horizontal frame member and exemplary straight frame member 408v is acting as a vertical frame member such that straight frame member 408h is oriented substantially perpendicularly to frame member straight 408v. As illustrated, first body member 452 and second body member 454 are illustrated in broken lines because first body member 452 is located within passageway 428 of straight frame member 408v and second body member 454 is located within passageway 428 of straight frame member 408h. Angled protrusion 456 of corner frame member 450, however, is not shown in broken lines because it is visible when first body member 452 and second body member 454 receive straight frame member 408v and straight frame member 408h. As also illustrated, ends of each of the straight frame members 408h and 408v have been cut at an angle of approximately 45 degrees so that the ends of straight frame member 408h and straight frame member 408v abut angled protrusion 456 of corner frame member 450. Likewise, in FIG. 8, each corner member 350 in FIGS. 2 and 3 receives end portions of horizontal frame members 308 and 310 and vertical frame members 312 and 314, which have also been cut at an angle of approximately 45 degrees.

Although not specifically illustrated, corner frame member 450, straight frame member 408*h* and straight frame member 408*v* can be held together is a plurality of different ways. In one embodiment, first and second body members 452 and 454 of corner frame member 450 and straight frame members 408*h* and 408*v* are fastened together with a fastener, such as glue, adhesive, adhesive tape or the like. Other types of fastening mechanisms are also possible. For example, corner frame member 450 and straight frame members 408*h* and 408*v* are glued together before being shipped to their final destination, such as a retail store.

With reference back to FIGS. 2 and 3, product highlighter 300 also includes a pair of side panels 304 and 306. In particular, first side panel 304 is attached to first vertical frame member 312 along its length and second side panel 306 is attached to second vertical frame member 314 along its length. Each of side panels 304 and 306 include depth dimensions 368 and 370 (FIG. 3). Depth dimensions 368 and 370 extend along a depth of the first display shelf. For example, along a depth 281 of a display shelf as illustrated in FIG. 1.

Figure 9:
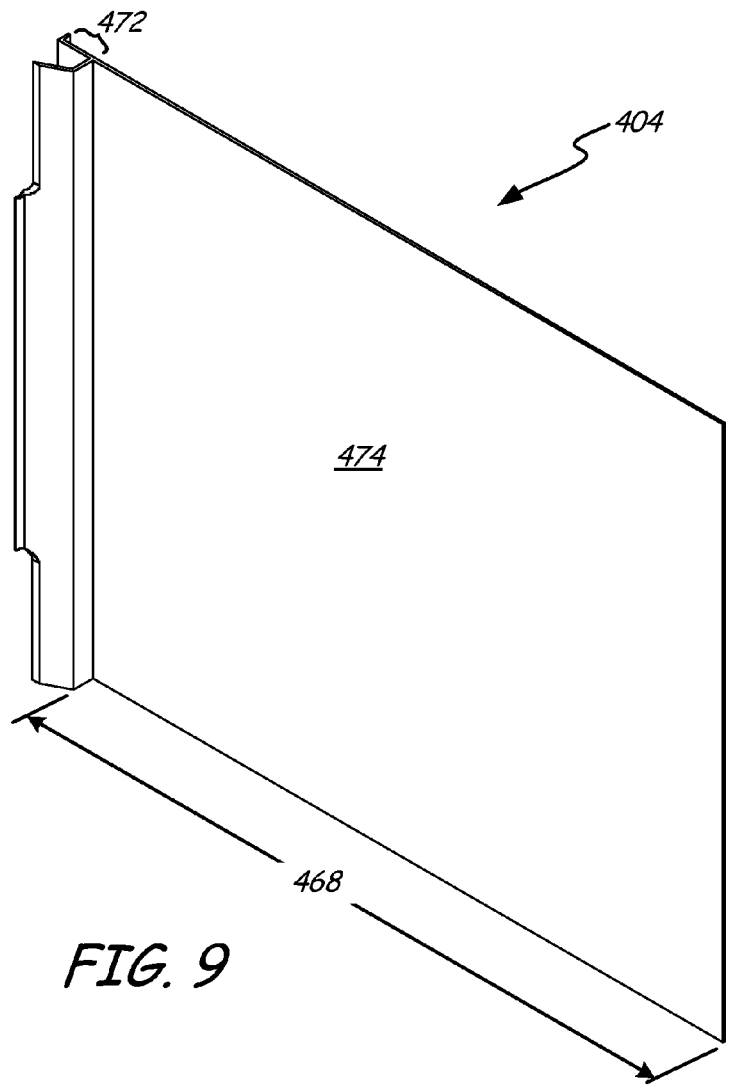
FIG. 9 is a perspective view of an exemplary side panel of a product highlighter.
Figure 10:
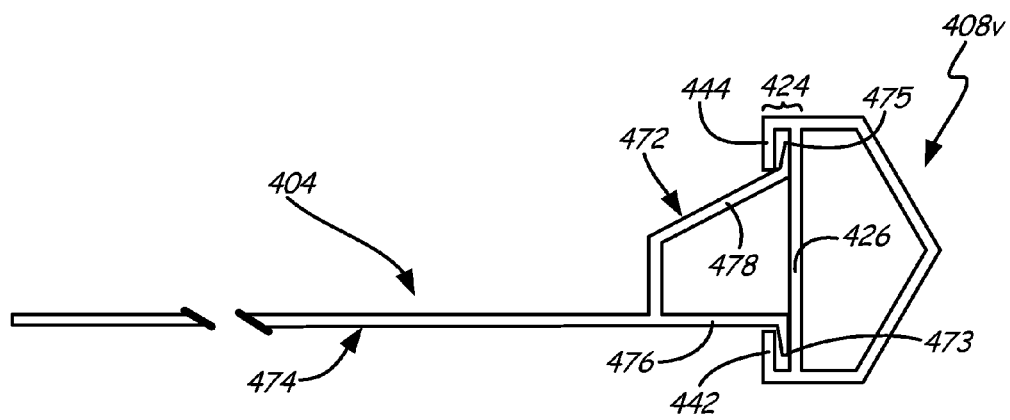
FIG. 10 is a profile view illustrating the exemplary straight frame member of FIGS. 4 and 5 receiving a portion of the exemplary side panel of FIG. 9.

FIG. 9 is a perspective view of an exemplary side panel or divider 404 and FIG. 10 is a profile view of exemplary side panel or divider 404 as attached to exemplary straight frame member 408*v* when acting as a vertical frame member. Exemplary side panel 404 is made of a single, continuous material, such as styrene or other type of polymer or metal, and can be used for side panel or divider 104 in FIG. 1 and both first and second side panels or dividers 304 and 306 in FIGS. 2 and 3. Exemplary side panel 404 includes a coupling portion 472 and a main body portion 474. Coupling portion 472 is configured to attach to straight frame member 408*v*. More specifically, coupling portion 472 is inserted into or received by track portion 424 of straight frame member 408*v* to form a snap-fit by compressing and releasing into track portion 424. For example, in FIGS. 2 and 3, side panels 304 and 306 are inserted into or received by vertical frame members 312 and 314, respectively. It should be realized, however, that in other embodiments, exemplary side panel 404 can fasten to exemplary straight frame member 408*v* using other fastening mechanisms.

Coupling portion 472 of exemplary side panel 404 includes a pair of flanged edges 473 and 475. In particular, a first leg 476 has a flanged edge 473 and a second leg 478 has a flanged edge 475. Flanged edge 473 of first leg 476 is insertable into the space defined between central wall 426 and first leg 442 and flanged edge 475 of second leg 478 is insertable into the space defined between central wall 426 and second leg 444.

Main body portion 474 of exemplary side panel or divider 404 acts to divide the products circumscribed by the frame from other products located on the first display shelf. Main body portion 474 includes a depth dimension 468. Depth dimension 468 extends along a depth 281 (see FIG. 1) of a first display shelf (such as first display shelf 202) and is less than or equal to depth 281 of the first display shelf. In FIGS. 2 and 3, the corresponding main body portions of side panels or dividers 304 and 306 include depth dimensions 368 and 370, respectively.

Figure 11:
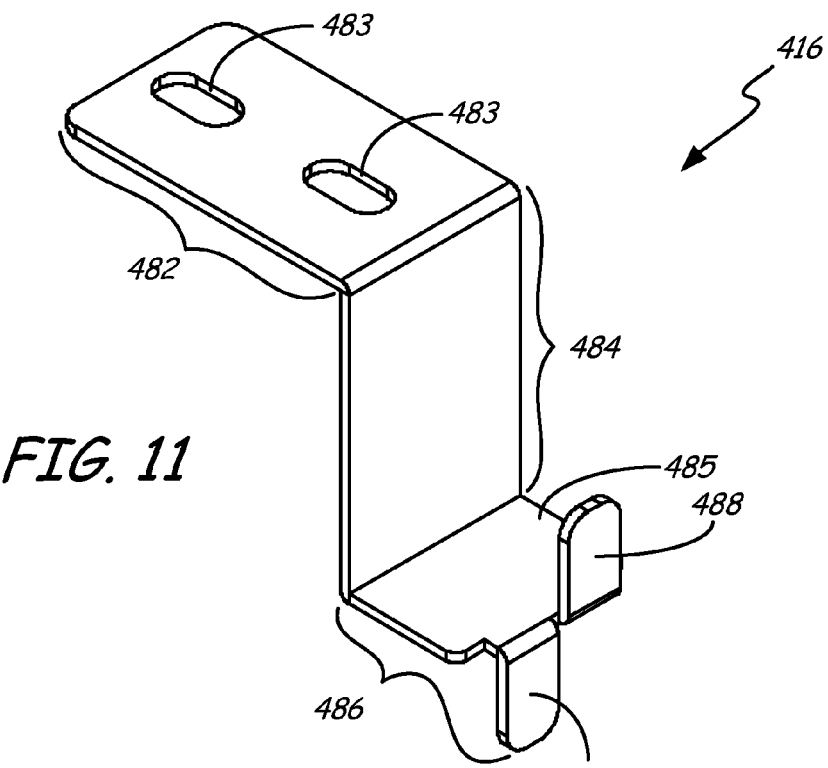
FIG. 11 is perspective view of an exemplary bracket of a product highlighter.
Figure 12:
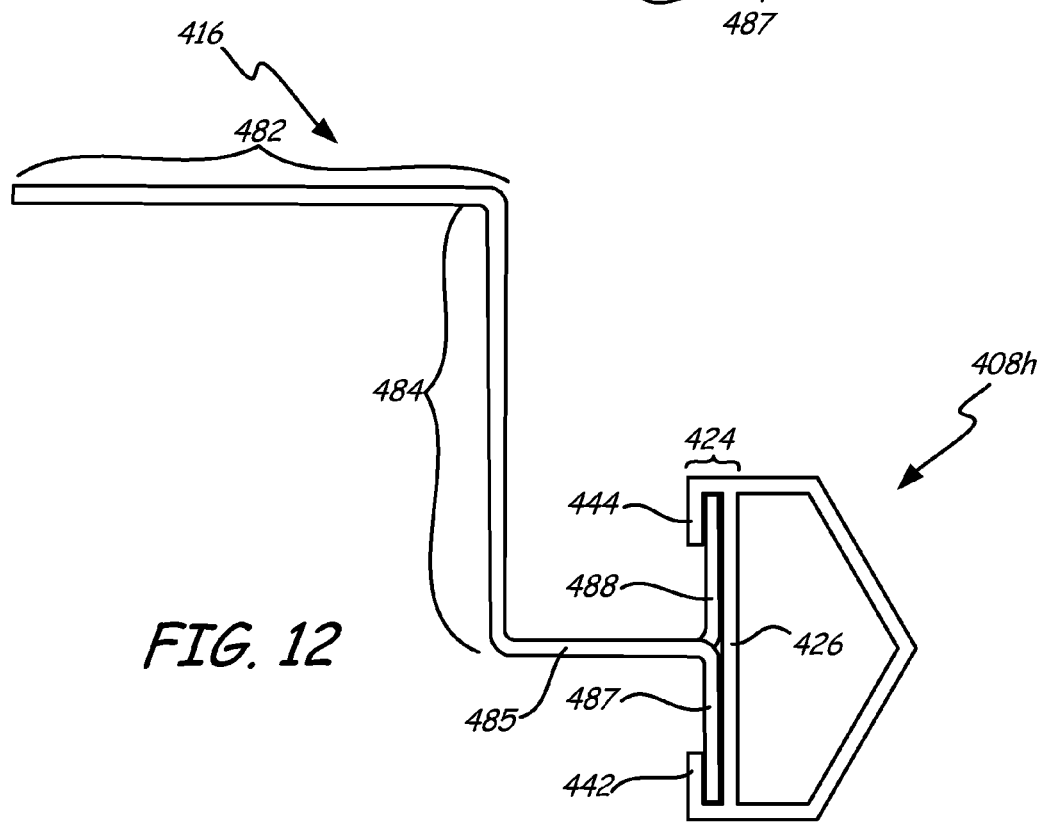
FIG. 12 is a profile view illustrating the exemplary straight frame member of FIGS. 4 and 5 receiving a portion of the exemplary bracket of FIG. 11.

FIG. 11 is a perspective view of an exemplary bracket 416 and FIG. 12 is a profile view of exemplary bracket 416 as attached to exemplary straight frame member 408*h* when acting as a horizontal frame member. Bracket 416 is made of a single, continuous material, such as metal or other material such as a polymer, and can be used for both first and second brackets 315 and 318 in FIGS. 2 and 3. Bracket 416 includes a mounting portion or flange 482, a connecting portion 484 and a coupling portion 486. Mounting portion 482 includes a plurality of through holes 483 for receiving fasteners for mounting to a display shelf. In particular, fasteners can be inserted through holes 483 and fasten to the display shelf such that a horizontal frame member of a product highlighter can be coupled to an underside of a first display shelf or an underside of a second display shelf located above the first display shelf. As previously discussed, in this way a product highlighter unobtrusively highlights product(s) or merchandise while still allowing price labels located on the front of the first display shelf to be visible. In addition, product can be easily removed from the first display shelf for purchase or easily restocked.

Coupling portion 486 of exemplary bracket 416 is connected to mounting portion 482 of bracket 416 by connecting portion 484. The main body 485 of coupling portion 486 is substantially parallel, but out-of-plane with mounting portion 482, while connecting portion 484 is substantially perpendicular to mounting portion 482 and the main body 485 of connecting portion 486. Besides coupling portion 486 including main body 485, coupling portion 486 includes a downward-oriented ear 487 and an upward-oriented ear 488 located at a free end. Both downward-oriented ear 487 and upward-oriented ear 488 are in-plane with each other and are substantially parallel to connecting portion 486 and therefore substantially perpendicular to mounting portion 482 and main body 485 of coupling portion 486.

Downward-oriented ear 487 and upward-oriented ear 488 are insertable into track portion 424 of exemplary straight frame member 408*h*. In particular, downward-oriented ear 487 is insertable into the space defined between central wall 426 and first leg 442 of frame member 408*h* and upward-oriented ear 488 is insertable into the space defined between central wall 426 and second leg 444 of exemplary straight frame member 408*h*. In this horizontal orientation of frame member 408*h*, first leg 442 of exemplary straight frame member 408*h* forms a lower part of track portion 424 and second leg 444 of frame member 408*h* forms an upper part of track portion 424. Therefore, downward-oriented ear 487 is insertable into a lower part of track portion 424 and upward-oriented ear 488 is insertable into an upper part of track portion 424.

As illustrated in FIGS. 2 and 3, product highlighter 300 includes two corresponding first brackets 316 and two corresponding second brackets 318. The downward-oriented ears 487-1 of the two first brackets 316 are insertable into the lower part of the corresponding track portion of upper frame member 308 and upward-oriented ears 388-1 of the two first brackets 316 are insertable into the upper part of the corresponding track portion of upper frame member 308. The downward-oriented ears 487-2 of the two second brackets 318 are insertable into the lower part of the corresponding track portion of lower frame member 310 and the upward-oriented ears 388-2 of the two second brackets 318 are insertable into the upper part of the corresponding track portion of lower frame member 310.

Figure 13:
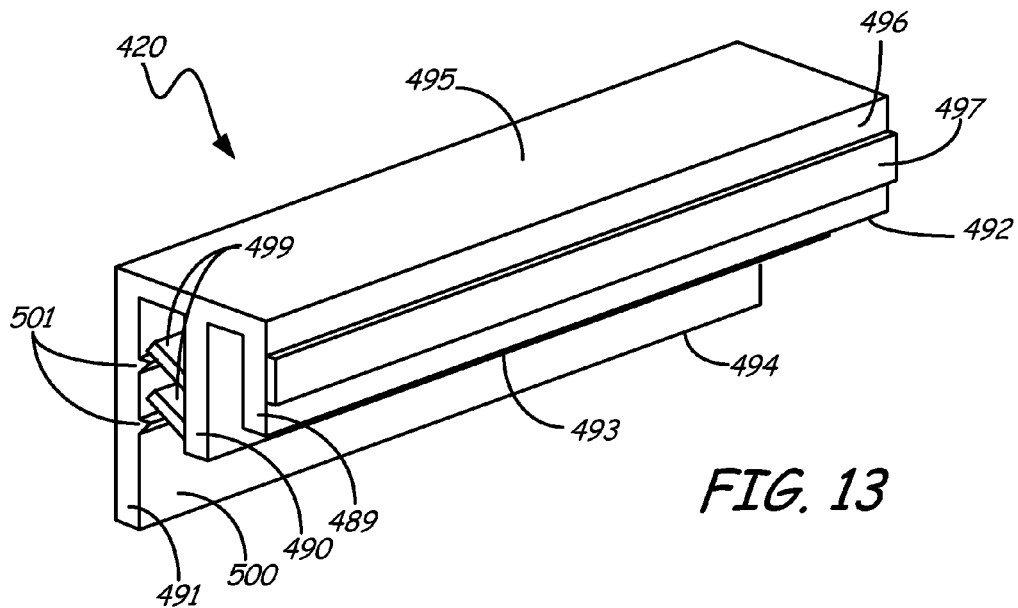
FIG. 13 is a perspective view of an exemplary sign holder member of a product highlighter.
Figure 14:
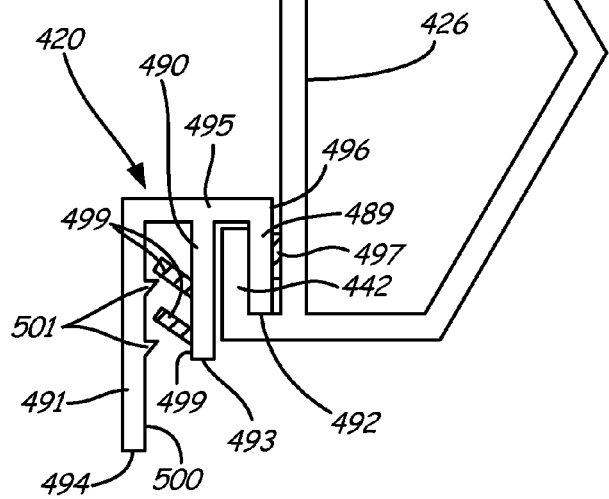
FIG. 14 is a profile view illustrating the exemplary straight frame member of FIGS. 4 and 5 receiving a portion of the exemplary sign holder of FIG. 13.

FIG. 13 is a perspective view of an exemplary sign holder member 420 and FIG. 14 is a profile view of exemplary sign holder member 420 as attached to exemplary straight frame member 408*h*. Exemplary sign holder member 420 is made of a single, continuous material, such as vinyl or other type of polymer or metal, and can be used for sign holder member 320 in FIGS. 2 and 3. Exemplary sign holder member 420 includes a forwardmost or first prong 489, a middle or second prong 490 and a rearwardmost or third prong 491. Forwardmost prong 489, middle prong 490 and rearwardmost prong 491 include downwardly facing free ends 492, 493 and 494, respectively, and extend from a main body 495. Rearwardmost prong 491 has a length that is greater than middle prong 490, which has a length that is greater than forwardmost prong 489. Defined between forwardmost or first prong 489 and middle or second prong 490 is a first slot and defined between middle or second prong 490 and rearwardmost or third prong 491 is a second slot.

Located on and extending across the entire width of forward surface 496 of forwardmost prong 489 includes a flexible member 497. Located on and extending across the entire width of backward surface 498 of middle prong 490 includes a plurality of protruding flexible members 499. Located on and extending across the entire width of forward surface 500 of rearwardmost prong 491 includes a plurality of protruding rigid members 501. As illustrated in FIG. 14, forwardmost prong 489 is insertable into track portion 424 of frame member 408h. In particular, forwardmost prong 489 is insertable into the space defined between central wall 426 and first leg 442 of frame member 408h. Flexible member 497 provides a gripping force so that sign holder member 420 does not fall out of track portion 424 of frame member 408h.

Although not specifically illustrated in FIGS. 13 and 14, a marketing sign made of a sheet material having indicia printed thereon is insertable into the space defined between middle prong 490 and rearwardmost prong 491. The printed indicia can be related to products being highlighted, for example, promotional or pricing information related to products being highlighted. A combination of protruding rigid members 501 and protruding flexible members 499 provide a gripping force so that the marketing sign does not fall out of sign holder member 420.

FIGS. 2 and 3 illustrate a sign holder member 320 in use. In particular, the first slot (defined between the forwardmost prong and the middle prong) of sign holder member 320 receives the lower part of the track portion of upper frame member 308 and the second slot (defined between the rearwardmost prong and the middle prong) is configured to receive marketing sign 321 for display. In one embodiment and as illustrated in FIGS. 2 and 3, although sign holder member 320 extends between the two first brackets 316, marketing sign 321 extends along upper horizontal frame member 308 from first vertical frame member 312 to second vertical frame member 314. In addition, while sign holder member 320 is coupled to upper frame member 308, sign holder member can be coupled to any of upper frame member 308, lower frame member 310, first side frame member 312 and second side frame member 314. To couple sign holder member 320 to lower frame member 310, the first slot of sign holder member 320 receives the upper part of the track portion of the lower frame member 310 and the second slot is configured to receive marketing sign 321 for display. To couple sign holder member 320 to first side frame member 312, the first slot of sign holder member 320 receives the inner part of the track portion of the first side frame member 312 and the second slot is configured to receive marketing sign 321 for display. To couple sign holder member 320 to second side frame member 314, the first slot of sign holder member 320 receives the inner part of the track portion of the first side frame member 314 and the second slot is configured to receive marketing sign 321 for display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A product highlighter comprising:
   a window defining an opening through which products resting on a first display shelf are viewable, the window being attached to the first display shelf and to a second display shelf located directly above the first display shelf, wherein a lower portion of the window is located below the products resting on the first display shelf, an upper portion of the window is located above the products resting on the first display shelf, but below the second display shelf located directly above the first display shelf, the window further comprises first and second side portions that couple the upper portion to the lower portion, and each of the upper portion, the lower portion, the first side portion and the second side portion of the window comprises a channel and a track, the track having a c-shaped profile;
   a first divider coupled to the first side portion of the window and including a depth dimension that extends along a depth of the first display shelf; and
   a second divider coupled to the second side portion of the window and including a depth dimension that extends along the depth of the first display shelf;
   wherein the first divider is inserted into the track of the first side portion and the second divider is inserted into the track of the second side portion.

2. The product highlighter of claim 1, wherein the window further comprises four corners, each corner configured to receive an end of one of the upper portion and the lower portion and an end of one of the first side portion and the second side portion such that one of the upper portion and the lower portion is oriented substantially perpendicularly to one of the first side portion and the second side portion.

3. The product highlighter of claim 1, further comprising a sign holder member coupled to the window, the sign holder member being inserted into the track of one of the upper portion, the lower portion, the first side portion and the second side portion to retain a marketing sign.

4. The product highlighter of claim 1, further comprising at least one first bracket for fastening the lower portion of the window to an underside of the first display shelf and at least one second bracket for fastening the upper portion of the window to an underside of the display shelf located directly above the first display shelf.

5. A product highlighter comprising:
   a window defining an opening through which products resting on a first display shelf are viewable, the window being attached to the first display shelf and to a second display shelf located directly above the first display shelf, wherein a lower portion of the window is located below the products resting on the first display shelf, an upper portion of the window is located above the products resting on the first display shelf, but below the second display shelf located directly above the first display shelf, the window further comprises first and second side portions that couple the upper portion to the lower portion, and each of the upper portion, the lower portion, the first side portion and the second side portion of the window comprises a channel and a track, the track having a c-shaped profile;
   at least one first bracket for fastening the lower portion of the window to an underside of the first display shelf and at least one second bracket for fastening the upper portion of the window to an underside of the display shelf located directly above the first display shelf;
   wherein the at least one first bracket and the at least one second bracket further comprise a downward-oriented ear and a upward-oriented ear that are located in plane with each other, the downward-oriented ear of the at least one first bracket being inserted into a lower part of the track of the lower portion of the window and the downward-oriented ear of at least one second bracket being inserted into a lower part of the track of the upper portion of the window and the upward-oriented ear of the at least one first bracket being inserted into an upper part of the track of the lower portion of the window and the upward-oriented ear of the at least one second bracket being inserted into an upper part of the track of the upper portion of the window.

6. A product highlighter comprising:
a frame configured to circumscribe merchandise located on a display shelf of a display shelving unit, the frame comprising:
a first horizontal frame member;
a second horizontal frame member spaced apart from the first horizontal frame member;
a first vertical frame member coupling the first horizontal frame member to the second horizontal frame member; and
a second vertical frame member spaced apart from the first vertical frame member and coupling the first horizontal frame member to the second horizontal frame member;
wherein the first horizontal frame member, the second horizontal frame member, the first vertical frame member and the second vertical frame member all include the substantially same profile including a channel portion and a track portion, the channel portion and the track portion sharing a central wall wherein the channel portion of the first horizontal frame member, the second horizontal frame member, the first vertical frame member, and the second vertical frame member comprise a closed passageway defined by the central wall, a first side wall extending from a first end of the central wall, a second side wall extending from a second end of the central wall, a first front wall extending from the first side wall opposite the central wall, and a second front wall extending from the second side wall to the first front wall.

7. The product highlighter of claim 6, wherein the first front wall and the second front wall are oriented at an angle from each other that is greater than 90 degrees.

8. The product highlighter of claim 7, wherein the track portion of each of the first horizontal frame member, the second horizontal frame member, the first vertical frame member and the second vertical frame member comprises a c-shaped channel and is defined by the central wall, a first side wall, a second side wall, a first leg that extends from the first side wall and a second leg that extends from the second side wall, the first leg and the second leg being located a first distance from each other.

9. The product highlighter of claim 8, further comprising a sign holder member coupled to the frame, the sign holder member comprising:
a first prong;
a second prong, wherein a first distance between the first prong and the second prong defines a first slot maintaining one of the first leg and the second leg of the track portion of one of the first horizontal frame member, the second horizontal frame member, the first vertical frame member and the second vertical frame member; and
a third prong, wherein a second distance between the second prong and the third prong defines a second slot for receiving and retaining a marketing sign.

10. The product highlighter of claim 9, wherein the second horizontal frame member is attached to an underside of the display shelf with at least one first bracket and the first horizontal frame member is attached to an underside of a different display shelf located directly above the display shelf with at least one second bracket.

11. The product highlighter of claim 9, wherein the sign holder member further comprises a main body, wherein the first prong, the second prong, and the third prong each extends in a first direction from the main body to a different free end opposite the main body.

12. The product highlighter of claim 6, further comprising a first side panel coupled to the first vertical frame member and extending along a depth of the display shelf and a second side panel coupled to the second vertical frame member and extending along the depth of the display shelf, the first side panel having a pair of flanged edges transversely extending relative to a remainder of the first side panel and received by the channel portion of the first vertical frame member and the second side panel having a pair of flanged edges transversely extending relative to a remainder of the second side panel and received by the track portion of the second vertical frame member.

13. The product highlighter of claim 6, further comprising four corner members, each corner member configured to receive an end portion of one of the first horizontal member and the second horizontal member and an end portion of one of the first vertical member and the second vertical member such that one of the first horizontal member and the second horizontal member is oriented substantially perpendicularly to one of the first vertical member and the second vertical member.

14. A product highlighter comprising:
a frame configured to circumscribe merchandise located on a display shelf of a display shelving unit, the frame comprising:
a first horizontal frame member,
a second horizontal frame member spaced apart from the first horizontal frame member,
a first vertical frame member coupling the first horizontal frame member to the second horizontal frame member, and
a second vertical frame member spaced apart from the first vertical frame member and coupling the first horizontal frame member to the second horizontal frame member,
wherein:
the first horizontal frame member, the second horizontal frame member, the first vertical frame member and the second vertical frame member all include the substantially same profile including a channel portion and a track portion, the channel portion and the track portion sharing a central wall,
the channel portion of the first horizontal frame member, the second horizontal frame member, the first vertical frame member and the second vertical frame member comprise a passageway defined by the central wall, a first side wall, a second side wall, a first front wall and a second front wall, wherein the first front wall and the second front wall are oriented at angle from each other that is greater than 90 degrees,
the track portion of each of the first horizontal frame member, the second horizontal frame member, the first vertical frame member and the second vertical frame member comprises a c-shaped channel and is defined by the central wall, a first side wall, a second side wall, a first leg that extends from the first side wall and a second leg that extends from the second side wall, the first leg and the second leg being located a first distance from each other;

a sign holder member coupled to the frame, the sign holder member comprising:
  a first prong,
  a second prong, wherein a first distance between the first prong and the second prong defines a first slot for receiving one of the first leg and the second leg of the track portion of one of the first horizontal frame member, the second horizontal frame member, the first vertical frame member and the second vertical frame member, and
  a third prong, wherein a second distance between the second prong and the third prong defines a second slot for receiving and retaining a marketing sign;

wherein:
  the second horizontal frame member is attached to an underside of the display shelf with at least one first bracket,
  the first horizontal frame member is attached to an underside of a different display shelf located directly above the display shelf with at least one second bracket,
  the at least one first bracket and the at least one second bracket further comprise a downward-oriented ear and a upward-oriented ear, the downward-oriented ear being inserted into a space between the central wall and the first leg of the track portion of one of the first horizontal member and the second horizontal member and the upward-oriented ear being inserted into a space between the central wall and the second leg of the channel portion of one of the first horizontal member and the second horizontal member.

15. A product highlighter comprising:
a frame that circumscribes merchandise located on a lower display shelf of a display unit, the frame including an upper member, a lower member, and a pair of opposing side members that extend between and couple the upper member to the lower member;
at least one upper connector attaching the upper member of the frame to an underside of an upper display shelf located above the lower display shelf so that the upper member of the frame is located below the upper display shelf and above the merchandise located on the lower display shelf; and
at least one lower connector attaching the lower member of the frame to an underside of the lower display shelf so that the lower member of the frame is located below the lower display shelf and below the merchandise located on the lower display shelf;

wherein the frame has an overall length less than an overall length of the lower display shelf such that the frame highlights circumscribed merchandise placed on the lower display shelf from other merchandise placed on the lower display shelf outside outer boundaries of the frame wherein each of the upper member, the lower member, and the pair of opposing side members all have substantially the same profile.

16. The product highlighter of claim 15, further comprising:
  a first divider directly attached to the one of side members to further separate the circumscribed merchandise from the other merchandise located on the lower display shelf, wherein the first divider extends along a depth of the lower display shelf; and
  a second divider directly attached to the other of the side members to further separate the circumscribed merchandise from the other merchandise located on the lower display shelf, wherein the second divider extends along a depth of the lower display shelf.

17. The product highlighter of claim 15, further comprising at least one sign holder attached to one of the upper member, the lower member and the side members, the at least one sign holder member configured to support a marketing sign having printed indicia relating to the circumscribed merchandise.

18. The product highlighter of claim 15, in combination with the display unit.

19. The combination of claim 18, wherein the upper display shelf includes a substantially horizontal surface and a front edge surface extending downwardly from a front edge of the substantially horizontal surface, wherein a topmost edge of the frame is positioned below a lowermost edge of the front edge surface.

20. The product highlighter of claim 15, further comprising:
  a first divider including a main portion and two opposing legs transversely extending relative to the main portion,
  wherein:
    each of the opposing side members of the frame includes an elongated C-shaped track portion open to a rear of the respective one of the opposing side members,
    each of the two opposing legs of the first divider is maintained within the C-shaped track portion of one of the opposing side members to couple the first divider with the frame, and
    the main portion extends rearwardly from the two opposing legs to further separate the circumscribed merchandise from other merchandise located on the lower display shelf.

* * * * *